April 21, 1959 K. H. DANNEHL ET AL 2,883,177
DEVICE TO PREVENT THE INDICATING OR THE PRINTING
OF ERRONEOUS WEIGHTS OF ERRATICALLY MOVING LOADS
Filed Oct. 18, 1954 3 Sheets-Sheet 1
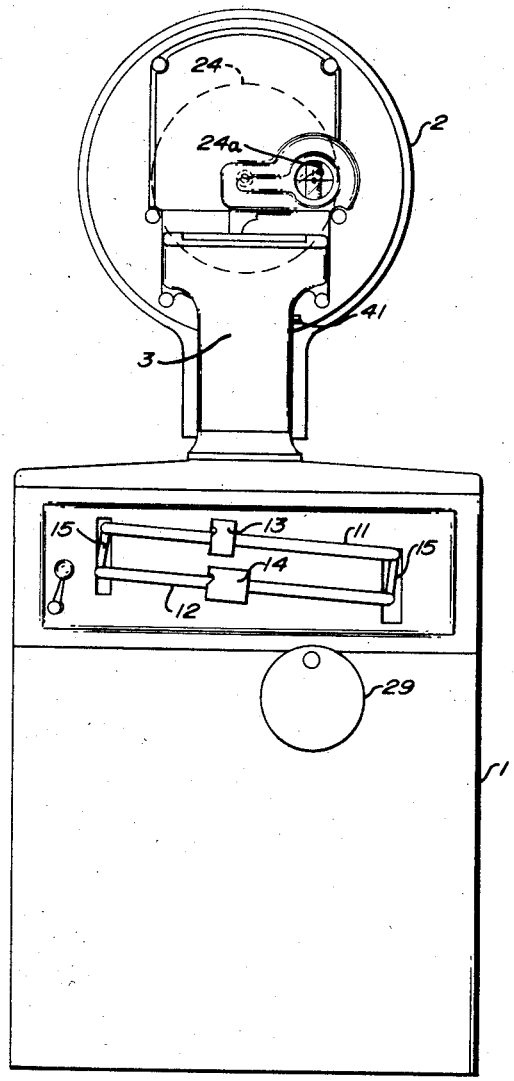
Fig. I
INVENTORS
KURT H. DANNEHL
BY JOHANN HOUWELING
ATTORNEYS April 21, 1959　　K. H. DANNEHL ET AL　　2,883,177
DEVICE TO PREVENT THE INDICATING OR THE PRINTING
OF ERRONEOUS WEIGHTS OF ERRATICALLY MOVING LOADS
Filed Oct. 18, 1954　　　　　　　　　　　3 Sheets-Sheet 2
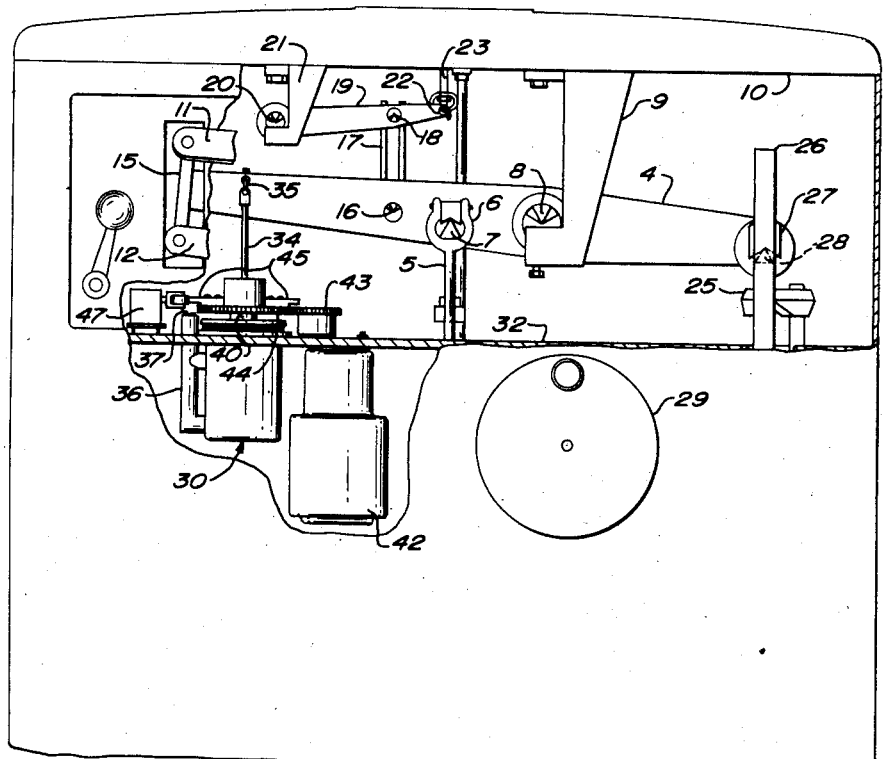
Fig. II
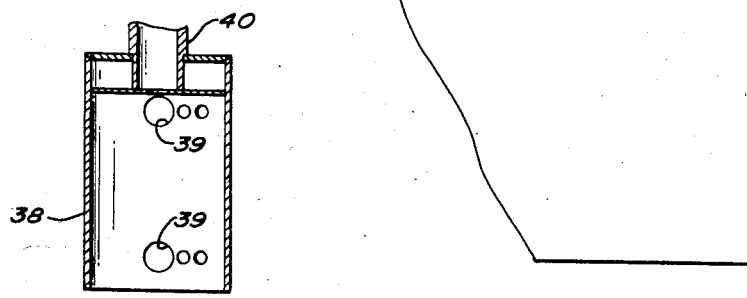
Fig. V
INVENTORS
KURT H. DANNEHL
BY JOHANN HOUWELING
*Marshall, Marshall & Yeasting*
ATTORNEYS

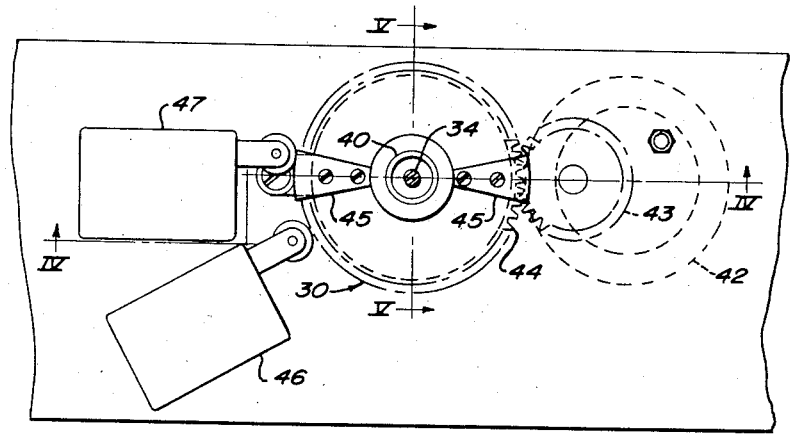
_Fig_ III
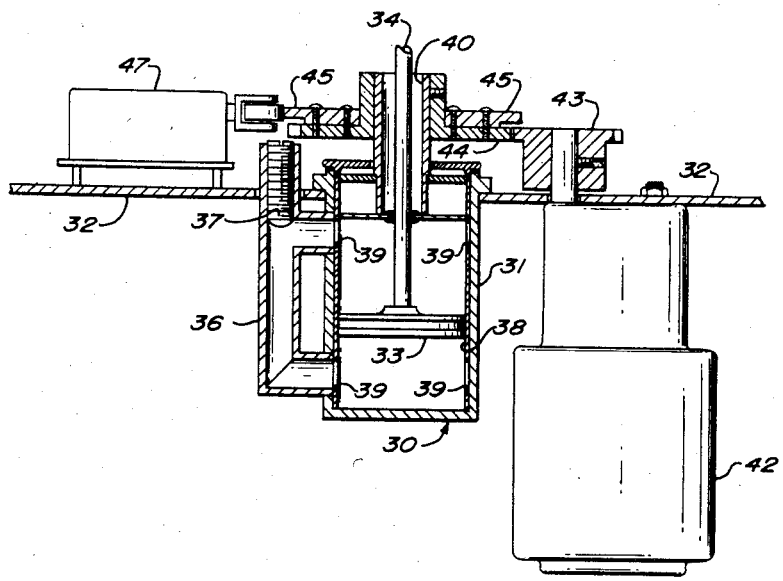
_Fig_ IV
INVENTORS
KURT H. DANNEHL
JOHANN HOUWELING
BY
Marshall, Marshall & Gersting
ATTORNEYS

United States Patent Office 2,883,177
Patented Apr. 21, 1959

2,883,177

DEVICE TO PREVENT THE INDICATING OR THE PRINTING OF ERRONEOUS WEIGHTS OF ERRATICALLY MOVING LOADS

Kurt H. Dannehl, Hoffnungsthal, and Johann Houweling, Koln-Bickendorf, Germany, assignors to Toledo-Werk-Fabrik automatischer Waagen und Prufmaschinen Dipl. Ing. Th. Prumm & Ed. Leopold, Cologne-Sulz, Germany Application October 18, 1954, Serial No. 462,958

Claims priority, application Germany October 30, 1953

5 Claims. (Cl. 265—5)

This invention relates to automatic weighing scales and in particular to means for preventing the indicating or printing of erroneous weights of erratically moving loads.

When moving loads, e.g., living animals, are weighed, it is difficult to ascertain the correct dead-weight because the indicating and printing mechanism normally fluctuates in response to such loads. Known methods of locking automatic weighing scales, whereby subsequent shocks from an erratically moving load cannot disturb the indicating or printing mechanism have been unsatisfactory because it has been impossible to lock the scales just when the correct dead-weight of the moving load was indicated.

Automatic weighing scales are usually equipped with a hydraulic dashpot to control the motion of the lever system so that the indicator will quickly come to rest after a change in load. The ordinary dashpot, however, cannot control the motion of the lever system so that the indicator will come to rest when the load on the weighing scale continues to move erratically.

Ordinary dashpots comprise a liquid filled cylinder and a loosely fitted piston operating within the cylinder. The piston is attached, by means of a stem and pivoted connection, to some point of the lever system which moves during a weighing operation. The amount of force developed by the dashpot for a given lever velocity is a function of the clearance between the piston and the walls of the cylinder and the restriction of additional adjustable by-passes. The by-pass may be either an orifice through the piston or a separate tube outside of the cylindrical portion of the cup-shaped body of the dashpot interconnecting the portions of the cylinder above and below the piston. The amount of damping is adjusted by varying the restriction of the by-passes.

The principal object of this invention is to provide a weighing scale for indicating the true weight of a load moving erratically on the scale.

More specifically, the principal object of this invention is to provide means for progressively increasing the damping effect of damping means connected to the automatic load counterbalancing and indicating mechanism of a weighing scale used for weighing erratically moving loads, such as living animals. The damping effect is progressively increased until the damping means substantially locks the scale, whereby the normally fluctuating indicating mechanism indicates the correct dead-weight.

More specific objects and advantages are apparent from the following description of a specific embodiment of the invention.

According to the invention, a weighing scale having automatic load counterbalancing and indicating mechanism is provided with a hydraulic dashpot including means for progressively restricting the flow of liquid through a by-pass for the damping medium in the dashpot until the dashpot substantially locks the scale. An erratically moving load is positioned on the platform of the scale before the means for progressively restricting the flow of damping medium through the by-pass is actuated. After the actuation, nothing but the moving load is permitted to touch the platform. When the erratically moving load is first positioned on the platform, the indicating mechanism fluctuates above and below the correct dead-weight. The result of the progressive damping effect is to progressively force down the amplitudes of the deviations of the fluctuating indicating mechanism from the correct dead-weight until the indicating mechanism is fixed at the correct dead-weight.

The invention may be more readily understood from the following detailed description of a specific embodiment in which description reference is made to the accompanying drawings.

In the drawings:

Figure I is a perspective view of a unit weight cabinet, of a dial housing, and of a printer housing of a weighing scale having a hydraulic dashpot and means for progressively increasing the damping effect of the dashpot.

Figure II is a front elevational view of the unit weight cabinet shown in Figure I, parts of the cabinet being broken away.

Figure III is a plan view of the dashpot and cooperating switches and motor shown in Figure II.

Figure IV is a sectional view taken substantially along the line IV—IV of Figure III.

Figure V is a sectional view of a cylindrical valve taken substantially along the line V—V of Figure III.

These specific drawings and the accompanying description are intended merely to illustrate the invention but not to limit its scope.

A weighing scale embodying the invention includes a cabinet 1 surmounted by a dial housing 2 having a printer housing 3 attached thereto. A load receiving mechanism (not shown) is provided and includes the usual load supporting levers and load receiving platform. The load moment is transmitted to a tare beam lever 4 through a suitable stirrup on the nose of the load supporting levers through a rod 5, suspended by means of a stirrup 6 from laterally extending pivots 7 in the tare beam lever 4, which, by means of fulcrum pivots 8, is rockably mounted upon a fulcrum strand 9 fixedly hung from a ceiling 10 in the interior of the cabinet 1. The tare beam lever 4 carries tare beams 11 and 12, with their poises 13 and 14, bolted to projecting arms 15 which beams and cooperating poises serve to offset tare weights. The cabinet 1 is usually mounted adjacent the load receiving platform in such a position that the depending rod 5 is vertically positioned to engage the aforementioned stirrup in the nose of the load supporting lever system.

Load forces to be counterbalanced are transmitted from the tare beam lever 4 through a power pivot 16 and a connecting linkage 17 to a load pivot 18 of a second lever 19, which, by means of fulcrum pivots 20, is rockably mounted upon a fulcrum bracket 21 fixedly hung from the ceiling 10 of the cabinet 1. The second lever 19 has a power pivot 22 engaging a bearing at the lower end of a steelyard rod 23 that extends upwardly into the dial housing 2 and is connected to automatic load counterbalancing mechanism enclosed within the dial housing 2. The automatic load counterbalancing mechanism can be of either the usual spring or pendulum counterbalance type.

The automatic load counterbalancing mechanism of the scale is operatively connected to a disk 24 (Figure I) which is rotated in a counterclockwise direction by an increase in load placed upon the load receiver. The disk 24 is swung through a distance proportional to the load placed upon the load receiver, being moved by the response of the load counterbalancing mechanism to such load. The disk 24 has a series of indicia 24a to provide visual indication of the weight counterbalanced by the load counterbalancing mechanism and a series of printing indicia so that printing mechanism (not shown) enclosed within the printer housing 3 may record the weight indicated by the disk 24. The printing mechanism, not a part of the present invention, is preferably of the well known type, as shown in U.S. Patent No. 2,483,989, that employs platens pinching the disk 24 against an inked ribbon and recording paper.

Auxiliary load counterbalancing mechanism may also be provided in the weighing scale. This may comprise a plurality of individual unit weights (not shown) having hooked portions 25 which may be successively and individually hooked over a hanger bar secured to the lower ends of plates 26 whose upper ends are provided with V-bearings 27 which are supported upon laterally extending pivots 28 in the tare beam lever 4 on the opposite side of the fulcrum point of the tare beam lever 4 from the connection between the rod 5 and the tare beam lever. The unit weights may be manually applied to or taken from the hanger bar by manipulation of a handle 29 located on the outside of the cabinet 1. Each time the handle 29 is turned clockwise 180 degrees the capacity of the scale is increased by a fixed amount equal to the capacity of the disk 24. Each time the handle 29 is turned counterclockwise 180 degrees the capacity of the scale is decreased by a fixed amount equal to the capacity of the disk 24.

To prevent continued oscillation of the tare beam lever 4 and the disk 24 operatively attached thereto with changes in load, a damping means or hydraulic dashpot 30 is provided. The dashpot 30 comprises a cup-shaped, liquid filled body or cylinder 31 secured to a shelf 32 within the cabinet 1. The dashpot is provided with a loosely fitted plunger or piston 33 operating within the cylinder which piston 33 is attached by means of a stem 34 and pivoted connection 35 to the tare beam lever 4. The cylinder 31 has a by-pass tube 36 outside of the cylinder interconnecting the portions of the cylinder above and below the piston 33. The amount of damping effect produced by the dashpot is adjusted by varying the flow of fluid through the by-pass tube 36 by means of a screw valve 37 (Figure IV). The dashpot, as so far described, is ordinary equipment for automatic weighing scales and is used to produce a normal damping effect regulated by the screw valve 37.

The present invention comprises means for progressively increasing the damping effect of the dashpot 30, whereby the weighing scale indicates the true weight of a load moving erratically on the scale. When an erratically moving load, e.g., a living animal, is positioned on the platform of the weighing scale, the disk 24 fluctuates above and below the correct dead-weight. The present progressive damping effect is provided to progressively force down the amplitudes of the deviations of the fluctuating disk from the correct dead-weight until the disk is fixed at the correct dead-weight.

The means for progressively increasing the damping effect of the damping means or dashpot 30 includes a cylindrical valve 38 having two pairs of holes 39 in the wall of the valve. The holes in each pair of holes are oppositely located and so positioned that the cylindrical valve 38 can be turned to two positions 180 degrees apart to permit a free flow of fluid from the cylinder 31 through the by-pass tube 36. The cylindrical valve 38 is fitted within the cylinder 31 so that the piston 33 moves up and down within the valve and has a hollow shaft 40 through which the stem 34 extends. When an erratically moving load is on the weighing scale and when the cylindrical valve 38 is slowly turned so that none of the holes 39 register with the openings of the by-pass tube 36, the flow of fluid or damping medium through the by-pass tube 36 is restricted by the walls of the valve to substantially lock the normally fluctuating disk 24 which then indicates and prints the correct dead-weight.

Any means which will progressively increase the damping effect of the dashpot 30 may be utilized to achieve the principal object of the invention. Other ways to attain the same result are as follows:

(1) An ordinary valve may be used in lieu of the cylindrical valve 38. The ordinary valve can be tapped anywhere in the by-pass tube 36 and can be used to progressively restrict the flow of fluid through the by-pass tube.

(2) An orifice can be cut through the piston 33 and used as a by-pass in lieu of the by-pass tube 36. The orifice can be made adjustable to progressively increase the damping effect of the dashpot.

(3) A dashpot having a by-pass consisting of either a separate by-pass tube or an orifice in the piston can be used with a damping medium which can be magnetized. When an increasing magnetic field is applied to the damping medium, the damping medium becomes increasingly viscous to progressively increase the damping effect of the dashpot.

In operation, an erratically moving load is positioned upon the platform of the weighing scale when the cylindrical valve 38 is positioned as shown in Figure IV, i.e., with two of the holes 39 registering with the openings of the by-pass tube 36. In this position, the free circulation of the damping fluid through the tube 36 gives a normal damping effect regulated by the screw valve 37. A button 41 located at one side of the printer housing 3 is pressed to actuate a motor 42 hung from the shelf 32 of the cabinet 1. The motor 42 drives a gear 43 turning a second gear 44 attached to the hollow shaft 40 of the cylindrical valve 38. The gears are chosen so that the cylindrical valve 38 is turned very slowly, e.g., eight or ten seconds may be required to turn the cylindrical valve from start position to a position where the holes 39 no longer register with the openings of the by-pass tube 36. As the cylindrical valve 38 turns, the free-openings of the by-pass tube 36 become smaller and smaller and the flow of fluid through the tube is progressively restricted to increase the damping effect of the dashpot 30 until the tare beam lever 4 cannot be moved anymore by the erratically moving load. At this moment, one of a pair of opposed wings 45 attached to the gear 44 actuates a switch 46 (Figure III) initiating a normal printing cycle of the printer within the printer housing 3. The printer records the correct dead-weight of the erratically moving load while the scale is locked which correct dead-weight is also visually indicated by the indicia 24a. After the button 41 is pressed, it is very important that nothing but the erratically moving load touch the platform of the weighing scale.

After the cylindrical valve 38 has turned 180 degrees, the other of the pair of opposed wings 45 actuates a switch 47 shutting off the motor 42. In this position, two of the holes 39 again register with the free-openings of the by-pass tube 36, as shown in Figure IV, and the weighing scale is ready to weigh another erratically moving load. The effect of the cylindrical valve 38 closing the free-openings of the by-pass tube 36 is to cut down the amplitude of the deviations of the disk 24 from the correct dead-weight by the same proportion as the amount the openings of the by-pass tube 36 are closed. In this way, the deviations of the fluctuating disk 24 become smaller and smaller until the disk becomes fixed at exactly the zero-line of the amplitudes, i.e., the dead-weight of the erratically moving load.

Various modifications may be made in specific details of construction without departing from the spirit and scope of the invention.

Having described the invention, we claim:

1. In a weighing scale for indicating the true weight of a load moving erratically on the scale, in combination, automatic load counterbalancing and indicating mechanism, damping means operatively connected to the automatic mechanism, means for regulating the normal damping effect of the damping means, a motor, manually operable means for initiating the operation of said motor, and means driven by said motor from the instant of operation of said initiating means for progressively increasing the damping effect of the damping means beyond said normal damping effect while the load is being weighed.

2. In a weighing scale for indicating the true weight of a load moving erratically on the scale, in combination, automatic load counterbalancing and indicating mechanism, a dashpot having a fluid filled cup-shaped body, a plunger movable within the body and operatively connected to the automatic mechanism and a by-pass tube outside of the body interconnecting the portions of the body above and below the plunger, means for regulating the normal damping effect of the dashpot, a motor, manually operable means for initiating the operation of said motor, and means driven by said motor from the instant of operation of said initiating means for progressively restricting the flow of fluid through the by-pass tube to increase the damping effect of the dashpot beyond said normal damping effect while the load is being weighed.

3. In a weighing scale for indicating the true weight of a load moving erratically on the scale, in combination, automatic load counterbalancing and indicating mechanism, damping means operatively connected to the automatic mechanism, a motor, means for initiating operation of the motor, and means driven by said motor for unidirectionally and progressively increasing with the passage of time from the operation of said initiating means and for all conditions of said automatic mechanism the damping effect of the damping means to a maximum effectiveness beyond its normal damping effect.

4. In a weighing scale for indicating the true weight of a load moving erratically on the scale, in combination, mechanism for automatic load counterbalancing and indicating, damping means operatively connected to the mechanism, a load recording means, means for regulating the normal damping effect of the damping means, damping increasing means for progressively increasing the damping effect of the damping means beyond said normal damping effect while the load is being weighed, and means operated by the damping increasing means for initiating a recording operation when the progressive damping effect has reached its greatest effectiveness.

5. In a weighing scale for indicating the true weight of a load moving erratically on the scale, in combination, mechanism for automatic load counterbalancing and indicating, damping means operatively connected to the mechanism, recording means, damping increasing means to unidirectionally alter the damping effect of the damping means from a first level of damping progressively to a higher level of damping beyond said normal damping effect, and means operated by the damping increasing means to actuate said recording means while said damping means is at said higher level of damping.

References Cited in the file of this patent

UNITED STATES PATENTS

| | | |
|---|---|---|
| Re. 13,995 | Dunn | Oct. 19, 1915 |
| 1,026,626 | Green | May 14, 1912 |
| 1,359,272 | Pool | Nov. 16, 1920 |
| 1,558,146 | Craig | Oct. 20, 1925 |
| 1,829,540 | Reeves | Oct. 27, 1931 |
| 2,016,703 | Breaden et al. | Oct. 8, 1935 |
| 2,040,073 | Brendel | May 12, 1936 |

FOREIGN PATENTS

| | | |
|---|---|---|
| 268,839 | Italy | Oct. 30, 1929 |
| 435,934 | Great Britain | Sept. 30, 1935 |